April 12, 1932. E. C. BALLENTINE 1,854,014

PICTURE TRANSMITTING APPARATUS

Filed June 7, 1930

Inventor:
Edwin C. Ballentine,
by Charles E. Tullar
His Attorney.

Patented Apr. 12, 1932

1,854,014

UNITED STATES PATENT OFFICE

EDWIN C. BALLENTINE, OF SCHENECTADY, NEW YORK, ASSIGNOR TO GENERAL ELECTRIC COMPANY, A CORPORATION OF NEW YORK

PICTURE TRANSMITTING APPARATUS

Application filed June 7, 1930. Serial No. 459,795.

My invention relates to apparatus for electrically transmitting pictures. One object of my invention is the provision of improved apparatus of this character which is simple, light and compact in construction and which is adapted to be operated at high speed. Another object of my invention is the provision in such apparatus of means by which the transmission may be made from a flat, stationary picture or image. A further object is the provision of a unitary apparatus by means of which one may simultaneously send and receive pictures.

My invention will be better understood from the following description taken in connection with the accompanying drawings, and its scope will be pointed out in the appended claims.

Figure 1:
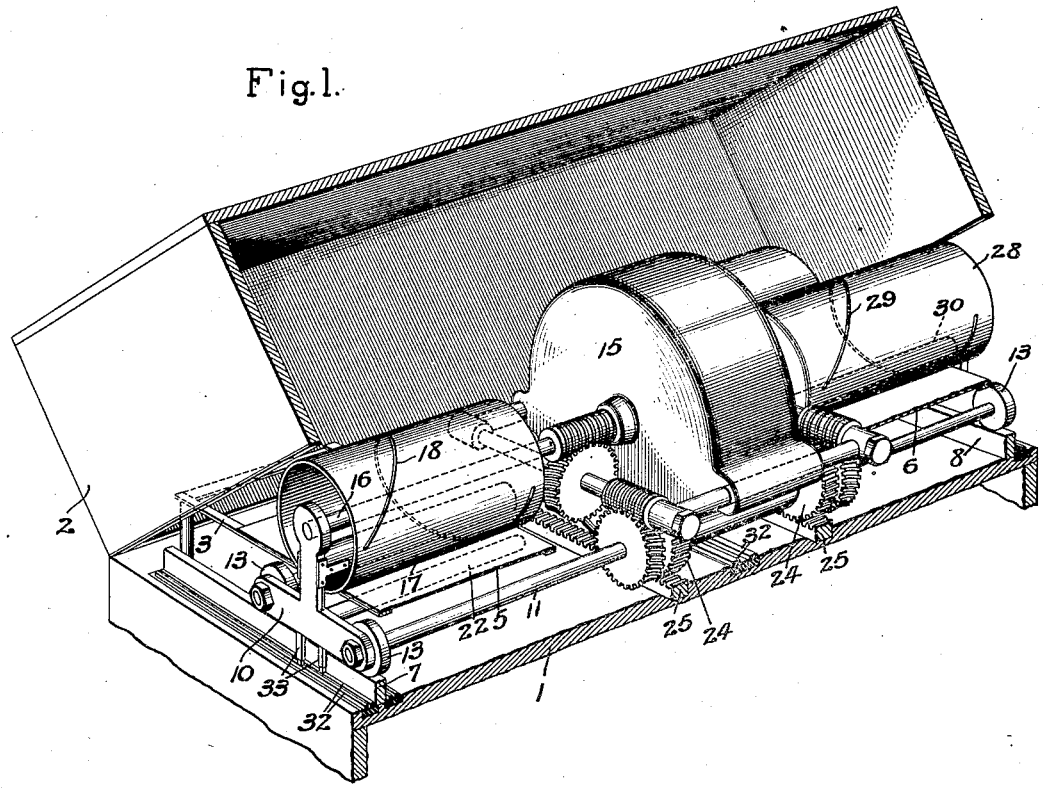
Figure 2:
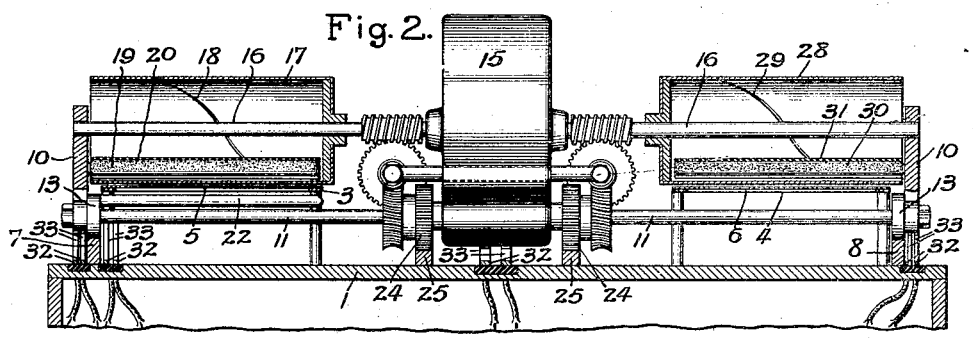
Figure 3:
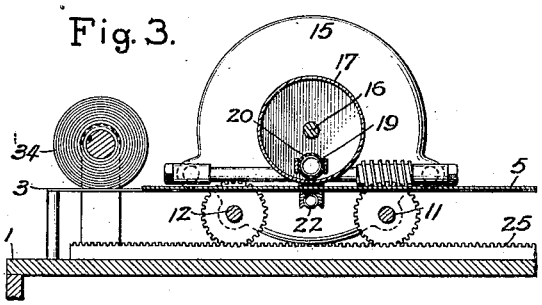

Referring to the drawings, Fig. 1 is a perspective view of an embodiment of my invention; Fig. 2 is a front view of the same with parts broken away; and Fig. 3 is an end view of the same.

The apparatus comprising my invention is shown mounted on the top 1 of a suitable cabinet having attached thereto the cover 2 which during the reception of a picture encloses the apparatus in a light tight manner. Supported by the top 1 are two similar fixed flat frames 3 and 4. The former is adapted to support in a fixed manner the transparent picture 5 which is to be transmitted and the latter is adapted to support in a like manner the light sensitive member 6, such as a film, a plate or a printing paper. On the top 1 are shown two parallel tracks 7 and 8 upon which the operating mechanism is mounted for movement in the plane of the picture 5. The operating mechanism comprises a carriage having the end frames 10 which are connected by shafts 11 and 12 at the ends of which are the track engaging wheels 13. Mounted upon the shafts 11 and 12 intermediate their ends is the electric motor 15 whose shaft 16 extends at each end and is journalled in the end plates 10. For scanning the picture 5 I have provided the hollow cylinder 17 which is fixed to the shaft 16 and is provided with the spiral slot 18. Within the cylinder 17, and supported from the end plate 10 is the photoelectric cell 19 which in this case is of tubular construction having its sensitive element extending nearly the full length of the cylinder. The cell is shown surrounded by the sleeve 20 which at that portion adjacent the cylinder is provided with a linear slot. Mounted below the picture 5 and directly beneath the cell is the light source 22 which in the present case is a column lamp extending substantially the full length of the cylinder. At each rotation of the cylinder 17 a narrow beam of light passes from the lamp 22 through the picture and through the fixed and movable slots at their point of intersection to the photo-electric cell, the light beam thereby making one transit across the picture. By the use of suitable gearing shown for example as two sets of worm gearing, the rotation of the motor shaft is communicated at a greatly reduced speed to the shaft 11 which through the spur gears 24 and racks 25 cause the carriage and parts supported thereby to be slowly advanced relative to the picture.

In order that a picture may be received simultaneously with the sending of the picture by the apparatus above described, I have provided on shaft 16 a second hollow cylinder 28 having a spiral slot therein similar to that of the sending apparatus. Within the cylinder 28 is the exposing lamp 30 which is of a column type and may, for example, be a neon lamp. Lamp 30 is surrounded by the sleeve 31 which, like the sleeve 20 surrounding the photo cell 19, has a narrow slot arranged adjacent the cylinder which slot cooperates with the spiral slot 29 in moving the exposing light beam across the light sensitive member 6. Suitable electrical connections for the motor, the photo-electric cell 19, the lamp 22 and the lamp 30 are provided by the several conductors or rails 32 resting on the top 1 and by the brushes 33 which engage the conductors and connect with the appropriate parts of the apparatus. It will be understood that the photo-electric cell 19 will be connected to a suitable amplifying device and the signals transmitted by wire or radio to a receiving station and that the lamp 30 of the receiving apparatus will be connected with suitable apparatus for receiving signals transmitted from a distant station. In Fig. 3 I have shown the paper 6 as a part of a roll 34 from which the paper may be drawn after each message has been received and torn off.

By constructing the apparatus to transmit from a fixed flat picture, I am enabled to transmit a view such for example as that which may be seen from an airship when looking down toward the earth. In this case a suitable opening would be made in the top 1 of the cabinet and by using a suitable lens project on a screen taking the place of the picture 5 an image of the view below. It may even be unnecessary to provide a screen on which to focus the image. With this apparatus pictures may be sent and received simultaneously, both the transmitter and the receiver being operated by the same driving motor.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Picture transmitting apparatus comprising a stationary flat member adapted to receive the picture to be transmitted, a carriage movable in the plane of said member, picture scanning means movably mounted on said carriage, a light sensitive cell fixed to the carriage, and means for moving the carriage and the scanning means.

2. Picture transmitting apparatus comprising a fixed member adapted to receive the picture to be transmitted, a carriage, scanning means mounted on the carriage comprising a hollow cylinder having a spiral slot therein and a cooperating diaphragm having an axial slot, a photo-electric cell within the cylinder and means for rotating the cylinder and moving the carriage.

3. Picture transmitting apparatus comprising a fixed flat member adapted to receive the picture to be transmitted, a carriage mounted for movement in the plane of said member, scanning means mounted on the carriage at one side of the picture comprising a hollow cylinder having a spiral slot therein and a cooperating diaphragm having an axial slot therein, a photo-electric cell within the cylinder, a linear light source on the opposite side of the picture, and a motor for rotating the cylinder and advancing the carriage.

4. Apparatus for simultaneously sending and receiving pictures comprising fixed flat members for supporting respectively a picture to be transmitted and a light sensitive member, a single carriage mounted for movement in the plane of said members, scanning means carried by the carriage and associated with each of said members, and a driving motor therefor mounted on the carriage.

5. Apparatus for simultaneously sending and receiving pictures comprising fixed flat members for supporting respectively a picture to be transmitted and a light sensitive member, a carriage, a plurality of scanning means mounted thereon including hollow cylinders having spiral slots therein, a common driving motor mounted on the carriage and arranged to rotate said cylinders and to advance the carriage.

In witness whereof, I have hereunto set my hand this 6th day of June, 1930.

EDWIN C. BALLENTINE.